UNITED STATES PATENT OFFICE 2,594,272

CYCLIC FLUOROALKYLENE OXIDE COMPOUNDS

Edward A. Kauck, St. Paul, Minn., and Joseph H. Simons, State College, Pa., assignors to Minnesota Mining & Manufacturing Company, St. Paul, Minn., a corporation of Delaware No Drawing. Application September 10, 1948, Serial No. 48,777

3 Claims. (Cl. 260—333)

This application relates to the discovery of a new and useful class of synthetic cyclic carbon compounds which contain only oxygen and flourine in addition to carbon.

More specifically, this application relates to saturated cyclic fluorine compounds which correspond to the saturated cyclic hydrogen compounds designatable as alkylene oxides, the hydrogen atoms thereof having been entirely replaced by fluorine atoms. The present compounds may be derived from the alkylene oxides by the electrochemical process hereinafter described, and may be referred to as fully fluorinated alkylene oxides.

The present compounds may be represented by the formula:

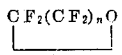

where $n$ is an interger having a value of two to four.

The compound corresponding to trimethylene oxide (1,3-propylene oxide) is hexafluorotrimethylene oxide, having the formula:

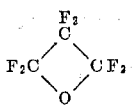

This compound is a gas having a boiling point of about minus 38° C.

The compound corresponding to tetramethylene oxide (tetrahydrofuran) is octafluorotetramethylene oxide, having the formula:

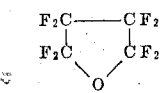

This compound is also a gas, having a boiling point of about 1° C.

The compound corresponding to pentamethylene oxide (tetrahydropyran) is decafluoropentamethylene oxide, having the formula:

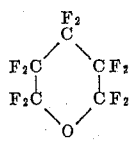

This compound is a volatile liquid, having a boiling point of about 32° C.

These compounds have physical and chemical properties which are in general quite different from those of the corresponding alkylene oxides. The boiling points are much lower even though the molecular weights are much higher. Thus the boiling point of pentamethylene oxide is about 81° C. whereas that of the corresponding fully fluorinated compound (mentioned above) is about 32° C.

These compounds have a high degree of chemical inertness; they do not burn or react with oxygen; they do not react with metallic sodium or potassium except at elevated temperatures. They are colorless. They are water-insoluble, whereas the corresponding alkylene oxides are water-soluble and some of them are highly water-soluble. They separate out when mixed with liquid hydrogen fluoride, although the alkylene oxides are quite soluble in the latter.

These new compounds may be employed as refrigerants and solvents, and as intermediates in the manufacture of other compounds.

The electrochemical process broadly described and claimed in the copending application of one of us (J. H. Simons), which has since matured as Patent No. 2,519,983 (dated August 22, 1950), may be employed in preparing compounds of this invention. Briefly, this process involves electrolyzing a liquid hydrogen fluoride solution of a hydrogen-containing compound of corresponding skeleton structure, resulting in the formation of the fully fluorinated product compound, which can be readily separated and purified. Thus, for example, tetramethylene oxide (tetrahydrofuran) can be used as the starting compound for making octafluorotetramethylene oxide. The starting compound may also be of an unsaturated type, since the process results in fluorine addition to produce the saturated product compound. Thus furan may be used for making octafluorotetramethylene oxide. The starting compound can contain one or more carbon-bonded side atoms or radicals other than hydrogen which are replaceable by fluorine in the operation of the process.

A simple type of electrolytic cell can be used, employing a nickel anode and an iron or steel cathode, for example. An iron or steel container can be used, which may be employed as a cathode, with a cover of iron or steel which is bolted in place. Anode and cathode plates, in alternating array, can be suspended from the cover. A suitable gasket material, and insulating material for electrode mountings and leads, is "Teflon" (polytetrafluoroethylene). An upper outlet for gaseous products, an upper inlet for charging materials, and a bottom outlet for liquid products, may be provided. The cell may be provided with a cooling jacket for maintaining a desired operating temperature.

Commercial anhydrous liquid hydrogen fluoride can be used. This normally contains a trace of water, but water need not be present and highly anhydrous hydrogen fluoride can be used. The starting compounds are soluble in the liquid hydrogen fluoride and provide adequate electrolytic conductivity.

A cell potential of about 4 to 8 volts D. C. has been found suitable. A current density of 20 or more amperes per square foot of anode surface can readily be obtained. Voltages sufficiently high to result in the formation of free fluorine are avoided. The process does not depend upon the generation of free fluorine and the latter, if produced, would result in explosions, electrode corrosion, and undesirable reactions.

A preferred operating pressure is atmospheric pressure and a preferred operating temperature is about 0° C.; but higher and lower operating pressures and temperatures can be employed.

Gaseous and volatile liquid product compounds can be withdrawn with and separated from the gaseous mixture evolved from the cell. Non-volatilized product compounds separate as a constituent of a liquid which is immiscible with the electrolyte and settles to the bottom of the cell from which it can be withdrawn. The constituent compounds of the gaseous and liquid mixtures can be separated by fractional distillation.

*Example 1*

Use was made of an iron laboratory cell containing a set of nickel anodes and iron cathodes, operating at atmospheric pressure and a temperature of 0° C.

154 grams of pentamethylene oxide (tetrahydropyran) was dissolved in 2000 grams of anhydrous liquid hydrogen fluoride and placed in the cell. The solution was electrolytically conductive and a current density of the order of 20 amperes per square foot of anode surface was obtained at the operating cell voltage, in the range of 4 to 6 volts D. C. During the 28 hour run, 71 grams of the starting compound was added to maintain conductivity.

At the end of the run, 98 grams of liquid product had collected in the bottom of the cell. This was fractionally distilled to yield a 66 gram fraction identified as relatively pure decafluoropentamethylene oxide:

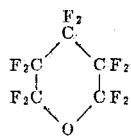

The gaseous mixture evolved from the cell was led through a low-temperature condenser to condense out most of the HF present in the mixture, then through an aqueous calcium chloride bubbler to remove remaining traces of HF, then through an aqueous potassium-sulfite-iodide bubbler to remove traces of $OF_2$, then through an aqueous potassium hydroxide bubbler to remove traces of $CO_2$, then through a dry potassium hydroxide bubbler to remove traces of water, and then through a liquid air trap to separate the hydrogen from the therein condensed compounds. The product collected in the trap was fractionated to yield a further 174 gram fraction of the above-mentioned decafluorpentamethylene oxide compound. The measured properties of this material are:

| | |
|---|---|
| Boiling point °C | 31–33 |
| Refractive index (at 29° C.) | 1.260 |
| Density (grams/cc. at 15° C.) | 1.68 |
| Dielectric constant (at 20° C.) | 1.77 |
| Molecular weight (from vapor density) | 268 |

The calculated formula weight of the pure compound is 266.

The infra-red absorption spectrum revealed strong carbon-fluorine bands and indicated that the material was fully saturated and contained no hydrogen, thereby further substantiating the identification.

*Example 2*

Using the same type of cell, 150 grams of tetramethylene oxide (tetrahydrofuran) was dissolved in 2000 grams of anhydrous liquid hydrogen fluoride and electrolyzed for a period of 18 hours without further addition of charging material. The product collected in the liquid air trap was fractionated to yield a 190 gram fraction identified as relatively pure octafluorotetramethylene oxide:

The measured molecular weight was 219 and the boiling point was 1° C. The calculated formula weight of the pure compound is 216.

The infra-red absorption spectrum revealed strong carbon-fluorine bands and indicated that the material was fully saturated and contained no hydrogen, thereby further substantiating the identification.

Having described various embodiments of the invention, for purposes of illustration rather than limitation, what we claim is as follows:

1. As new and useful compounds, the cyclic fluoroalkylene oxide compounds having the formula:

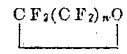

where $n$ is an integer having a value of two to four.

2. The new and useful compound, octafluorotetramethylene oxide, having the formula:

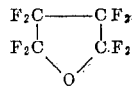

3. The new and useful compound, decafluoropentamethylene oxide, having the formula:

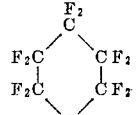

EDWARD A. KAUCK.
JOSEPH H. SIMONS.

REFERENCES CITED

The following references are of record in the file of this patent:

UNITED STATES PATENTS

| Number | Name | Date |
|---|---|---|
| 2,430,667 | Cass et al. | Nov. 11, 1947 |
| 2,433,844 | Hanford | Jan. 6, 1948 |
| 2,451,185 | Whaley | Oct. 12, 1948 |
| 2,456,768 | Chaney | Dec. 21, 1948 |